Patented Mar. 14, 1950

2,500,915

UNITED STATES PATENT OFFICE 2,500,915

METHOD OF PRODUCING FERROUS SHEET FOR MANUFACTURING RECEPTACLES

Robert R. Tanner, Birmingham, Mich., assignor to Parker Rust Proof Company, Detroit, Mich.

No Drawing. Application October 17, 1942, Serial No. 462,420

8 Claims. (Cl. 148—6.15)

This invention relates to a method of preparing sheets suitable for forming into soldered receptacles.

It has been the common practice to manufacture cans, small pails and similar articles from tinned ferrous sheets. The tin serves a double purpose in that it is not only highly resistant to attack by ingredients of many packaged materials but also serves as an excellent base for the necessary soldering operations.

In some instances where extra protection is necessary, the tinned sheets are painted prior to fabrication. The paint coat or coats are usually applied by roller coating methods. Strips of tin are left uncovered on the areas where soldered joints or seams are to be made.

The increasing scarcity of tin has resulted in a drastic reduction in the use of that metal in the container field. A large amount of research has been directed towards the discovery of an alternative treatment of the base metal. It has been found that certain chemically formed coatings, when their characteristics are suitably regulated, may be employed in place of tin in many instances with highly satisfactory results. One requirement of these coatings is that they must withstand the forming operations incident to container manufacture as will be more fully pointed out. Another necessary feature is that they must be applied in such a manner that they will not interfere with any subsequent soldering operations.

Ferrous surfaces are considered readily solderable under ordinary conditions, but in the container industry where extremely rapid soldering is necessary to handle large quantities of production, ferrous surfaces present serious difficulties in respect to the speed of operation that it is desired to attain. The presence of a chemically formed coating on the ferrous surface adds to the difficulties.

I have discovered that tin or other metal, such as solder itself, which is more readily solderable than the ferrous metal, may be applied to ferrous sheets in a predetermined pattern and the composite metal sheet subjected to a chemical coating solution whereby the ferrous surface is coated without adversely affecting the solderability of the superimposed pattern of non-ferrous metal.

The superimposed pattern usually assumes the form of strips. On small sheets they may appear only on the edges, whereas with larger sheets there may be a series of strips along the line of the intended seams. In the latter instance the width of the strips is usually greater than that required for the soldering operation and the strips are slit down the center when the sheet is cut to the container blank size.

The strips of tin or other solderable metal may be applied by various methods. Where the solderable metal is applied by non-electrolytic means it is necessary to first either heat the coated metal or to apply a suitable flux in order to obtain good adhesion and sufficient rapidity of operation. The flux may be applied and confined to the areas of the intended seams by brushes, wipers, or rolls. The solderable metal may be applied to the fluxed areas by automatic soldering tools. For example, rolls corresponding in number to the strips required may be used to carry the solderable material from a molten bath to a sheet of ferrous metal in parallel moving contact with their upper faces. The width of the roll faces may be varied both for the fluxing step and for the application of the solderable metal so that strips of any desired width may be produced.

If the strips are applied by electrolytic methods, the areas where they are not required may be masked off and the masking removed prior to the application of the chemical coat. The masking of the necessary areas may be accomplished by moving partitions of a resilient material, such as rubber, which travel with the sheet metal through the plating bath and leave exposed to the bath only those areas where the plated metal is desired. The partitions may be arranged to allow the plating of any desired arrangement of strips as well as for controlling the width of individual strips.

It has been found desirable to have some alloying between tin and the base ferrous metal. This apparently facilitates subsequent soldering operations. Where the tin is applied by the hot dip method sufficient alloying takes place, whereas when the tin is electroplated the alloying obtained is negligible. For this reason, it is advisable for rapid soldering to heat the electroplated tin to such an extent that sufficient alloying occurs.

Inasmuch as impurities on the ferrous surfaces are detrimental to the formation of the chemical coating to be applied, it may be necessary to clean the sheets after the non-electrolytic application of the solderable metal to eliminate any excess flux.

The next step in the production of the article produced in accordance with my invention resides in the application of the chemically formed coating. As previously indicated, the coating produced must meet certain requirements in order to be satisfactory for the manufacture of cans and similar containers from flat sheet stock. It must be sufficiently corrosion-resistant since it may be subjected to varying conditions of humidity and heat while in storage before fabrication, or after fabrication and before painting. It must serve as a good paint base since most cans are manufactured from chemically coated metal are painted. It is of the utmost importance that the paint adhere firmly to the surface during the life of the package. The chemical coating process must be one which has no objectionable action on the strips of tin or other solderable metal either by removing the metal of the strip excessively or by coating it. Should the latter occur, difficulties are encountered in subsequent soldering operations. The coating must also be capable of undergoing the various forming operations involved in can and other container manufacture without losing its adhesion to the underlying metal. Further, it must be capable of producing a substantially continuous, uniform coating over the entire ferrous surface in a very short length of time.

It is well known that oxide coatings may be readily produced on tin surfaces by various chemical solutions. Many organic acid coating solutions are also capable of coating the metal with insoluble tin salts of the acid employed. It has also been found that when tin has been exposed to the action of certain phosphate coating solutions, now used extensively in the metal treating art, a distinct coating is formed. In addition to this objection, phosphate solutions in common use produce coatings that are entirely too heavy to be suitable for the treatment of metal which is to be fabricated, especially after painting.

I have developed a method of producing phosphate coatings which meets each of the above requirements.

One method of obtaining the necessary type of coating includes a combination of chemical and mechanical means and is to be preferred where maximum speed in producing the coating is required.

The cleaned metal is run between a series of rolls that are wet with water, some of which operate at a peripheral speed slightly different from the rate of movement of the metal to be coated. The mechanism of this operation is not entirely understood, but it is effective in promoting uniformity of the coating and also in rendering the production of a good coating independent of small variations in the chemical make-up of the coating solution. From this step the metal passes between a series of rubber rolls whose peripheral speed is the same as the metal traveling between them, the phosphate coating solution being applied to the metal during this travel so that during the processing interval the metal is repeatedly subjected to pressure by the resilient rolls in the presence of the coating solution. The solution employed contains a material amount of chemical accelerating agents but the roller action during the processing has a marked effect in further accelerating the coating action.

The coating must be capable of satisfactorily withstanding forming operations without crumbling or losing its adhesion. This is made possible by a control of the coating weight and the size of the crystals of which the coating is largely composed. Both of these factors are influenced to a material extent by the differential speed rolls and by the rolls which operate during the coating action itself. However, the chemical nature of the processing solution is also of prime importance. Solutions in which zinc acid phosphate is the principal coating ingredient are suitable when properly accelerated by chemical agents. A combination of oxidizing agents, such as nitrate and chlorate, and a metallic accelerator, such as copper, have been found to provide sufficient acceleration so that a suitable coating may be produced in as little as 10 seconds when employed in combination with the roll mechanisms described above.

A typical processing solution has the following approximate analysis:

| | | |
|---|---|---|
| Chlorate | percent | 1 |
| Nitrate | do | .3–1 |
| Cu | do | .004–.008 |
| Zn | do | .5 |
| $PO_4$ | do | .8–1.0 |
| pH | | 2.2 |

The solution may be operated at around 160° F.

When a ferrous sheet having superimposed strips of tin or other solderable metal thereon is processed according to the method described, it is found that the entire ferrous surface exposed will be covered with a uniform, strongly adherent coating, whereas the non-ferrous surface will not be noticeably coated.

The adhesion of paint to the coating is materially increased by giving it a final rinse in a solution containing a compound of hexavalent chromium. Chromic acid may be used, but dichromates are more desirable and calcium dichromate is preferred. An aqueous solution containing about 25 grams of calcium dichromate per gallon and having a pH of 4 to 6 is especially effective. The rinse may be applied hot for about two seconds and the excess removed with rollers.

Such coatings seldom have a weight in excess of 110 mgs. per sq. ft. of surface treated. They may be further characterized by the absence of visible dusting, caused by powdering of the phosphate crystals, when coated container stock of 30 to 33 gauge is quickly bent through 180 degrees. To test the sheet for dusting it should be so placed that when it is bent the air currents set up will carry any dust formed into a strong beam of light.

It is to be understood that the procedure above is given only as one specific method of producing the type of coating fulfilling the various requirements and that it may be made by other solutions which are capable of forming coatings by chemical reaction with the ferrous surfaces without impairing the solderability of the solderable strips, and that not in all cases is it essential to employ mechanical steps involving the use of rolls. For example, a phosphate coating meeting all of the above requirements may be obtained by spraying cleaned metal for from 20 to 60 seconds with a similar processing solution.

The method of producing the article, in brief, includes as essential steps the application to a ferrous base sheet of strips of tin or other metal more readily solderable than the ferrous surface in a predetermined pattern along the lines of intended seams, and thereafter subjecting the composite article to a phosphate solution which by chemical reaction will produce a uniform, continuous, adherent, paint-holding, phosphate coating capable of being bent through 180 degrees without showing visible dusting, the coating solution and its conditions of application being such

What I claim is:

1. The method of preparing a ferrous sheet for formation into a soldered receptacle which comprises applying to a ferrous sheet, metal which is more readily solderable than the ferrous surface along portions which are to be soldered in the formation of the receptacle, thereafter treating the entire surface of the sheet with a chemical coating solution which does not impair the solderability of said solderable metal while it forms on the portions of the sheet not covered by said solderable metal a uniform, continuous, adherent, non-dusting, paint-bonding coating.

2. A method in accordance with claim 1 and wherein the coating solution is applied in a period not exceeding 10 seconds.

3. The method of preparing a ferrous sheet for formation into a soldered receptacle which comprises applying to a ferrous sheet, metal which is more readily solderable than the ferrous surface along portions which are to be soldered in the formation of the receptacle, thereafter treating the entire surface of the sheet with a phosphate coating solution accelerated by a combination of nitrate and chlorate which does not impair the solderability of said solderable metal while it forms on the portions of the sheet not covered by said solderable metal a uniform, continuous, adherent, non-dusting, paint-bonding coating.

4. The method of preparing a ferrous sheet for formation into a soldered receptacle which comprises applying to a ferrous sheet, metal which is more readily solderable than the ferrous surface along portions which are to be soldered in the formation of the receptacle, thereafter treating the entire surface of the sheet with a phosphate coating solution expedited by oxidizing agents and an accelerating metal compound which does not impair the solderability of said solderable metal while it forms on the portions of the sheet not covered by said solderable metal a uniform, continuous, adherent, non-dusting, paint-bonding coating.

5. The method of preparing a ferrous sheet for formation into a soldered receptacle which comprises applying to a ferrous sheet, metal which is more readily solderable than the ferrous surface along portions which are to be soldered in the formation of the receptacle, thereafter treating the entire surface of the sheet with a phosphate coating which does not impair the solderability of said solderable metal while it forms on the portions of the sheet not covered by said solderable metal a uniform, continuous, adherent, non-dusting, paint-bonding coating and expediting the action of the solution by repeated pressures of the solution against the metal during the coating operation.

6. The method of preparing a ferrous sheet for formation into a soldered receptacle which comprises applying to a ferrous sheet, metal which is more readily solderable than the ferrous surface along portions which are to be soldered in the formation of the receptacle, thereafter treating the entire surface of the sheet with a phosphate coating solution expedited by oxidizing agents and an accelerating metal compound, which does not impair the solderability of said solderable metal while it forms on the portions of the sheet not covered by said solderable metal a uniform, continuous, adherent, non-dusting, paint-bonding coating, and further accelerating the action of the solution by repeated subjection of the surfaces to the squeezing action of resilient rollers.

7. The method of preparing a ferrous sheet for formation into a soldered receptacle which comprises applying to a ferrous sheet, metal which is more readily solderable than the ferrous surface along portions which are to be soldered in the formation of the receptacle, thereafter treating the entire surface of the sheet for not over 10 seconds with an accelerated phosphate solution, which does not impair the solderability of said solderable metal while it forms on the portions of the sheet not covered by said solderable metal a uniform, continuous, adherent, non-dusting, paint-bonding coating.

8. The method of preparing a ferrous sheet for formation into a soldered receptacle which comprises applying to a ferrous sheet, metal which is more readily solderable than the ferrous surface along portions which are to be soldered in the formation of the receptacle, thereafter treating the entire surface of the sheet for not over 10 seconds with a phosphate coating solution accelerated by nitrate, chlorate and a compound of copper, which does not impair the solderability of said solderable metal while it forms on the portions of the sheet not covered by said solderable metal a uniform, continuous, adherent, non-dusting, paint-bonding coating.

ROBERT R. TANNER.

REFERENCES CITED

The following references are of record in the file of this patent:

UNITED STATES PATENTS

| Number | Name | Date |
|---|---|---|
| 896,751 | Norton | Aug. 25, 1908 |
| 1,647,851 | Bentley | Nov. 1, 1927 |
| 1,694,820 | Harris | Dec. 11, 1928 |
| 2,103,119 | Romanoff | Dec. 21, 1937 |
| 2,174,071 | Grupe | Sept. 26, 1939 |
| 2,175,599 | Finkbone et al. | Oct. 10, 1939 |
| 2,288,182 | Curtin | June 30, 1942 |
| 2,293,716 | Dorsey | Aug. 25, 1942 |
| 2,311,776 | Powell | Feb. 23, 1943 |
| 2,327,127 | Rath | Aug. 17, 1943 |
| 2,348,698 | Thompson | May 9, 1944 |
| 2,373,433 | Tanner | Apr. 10, 1945 |